May 6, 1941.  E. CEDER  2,241,183
COMBINATION FISHING ROD AND SAND SPIKE
Filed April 9, 1940
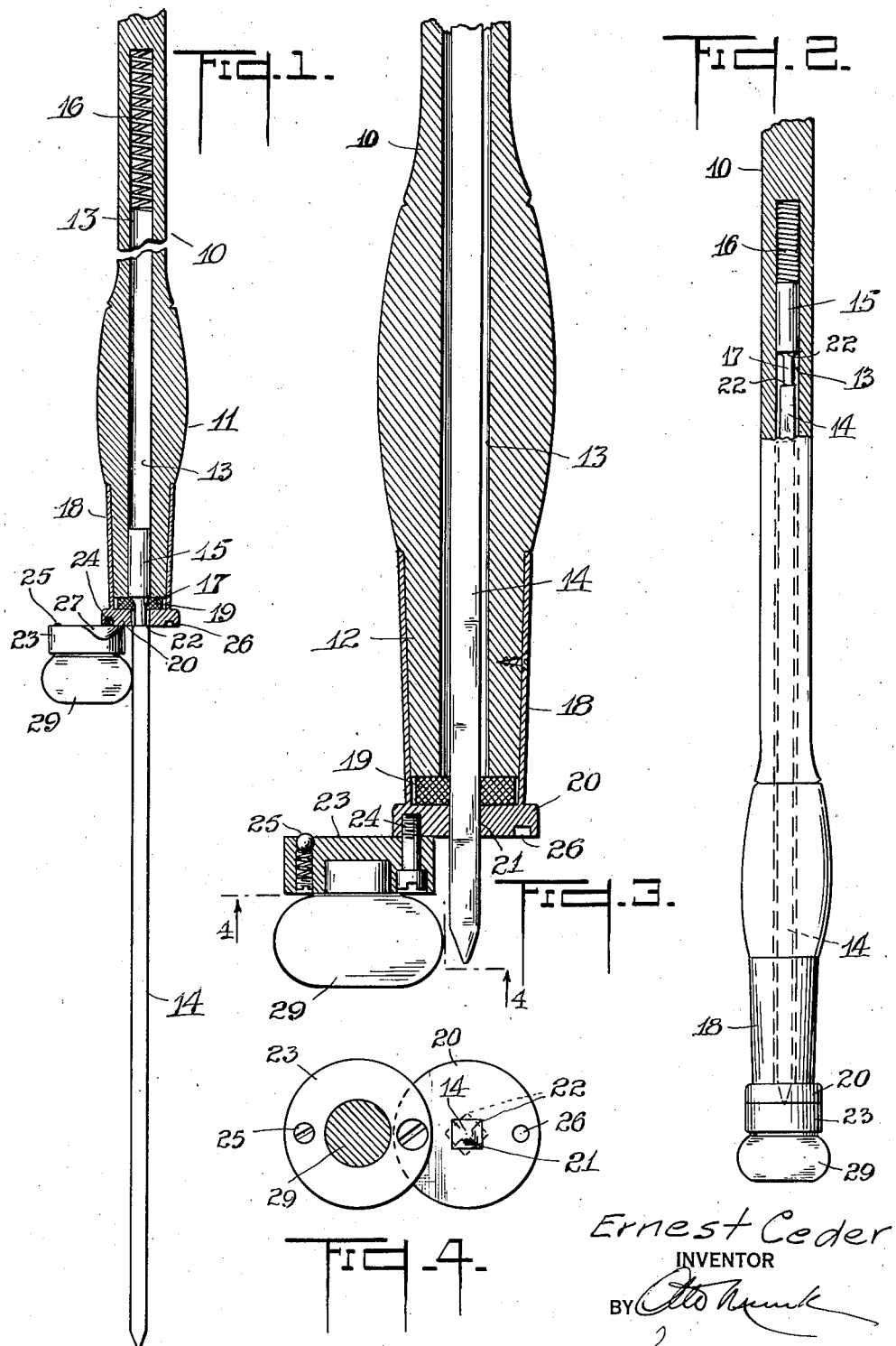
Ernest Ceder
INVENTOR
BY
ATTORNEY.

Patented May 6, 1941

2,241,183

UNITED STATES PATENT OFFICE 2,241,183

COMBINATION FISHING ROD AND SAND SPIKE

Ernest Ceder, New York, N. Y.

Application April 9, 1940, Serial No. 328,647

6 Claims. (Cl. 43—23)

This invention relates to improvements in fishing rod equipment and has reference particularly to a combined spring butt section of a fishing rod and sand spike.

A sand spike is normally a metal spike used in surf or shore fishing to support a rod in proper position after casting the line into the surf and while the fisherman is waiting for a strike. Sand spikes are driven into the sand in a more or less upright position and the upper end of the spike is usually provided with a socket into which the butt end of the rod is placed for support. This type of sand spike is efficient enough insofar as it actually performs the function of supporting the rod, but when a strike is made and the fisherman begins to "play" his fish, he is obliged to take up the rod from its support and follow up his fish until it is practical to land it. The "playing" process, as those familiar with this type of fishing well know, may carry the fisherman a mile or more away from the spot where the strike was made. The excitement of the moment and the quick action needed to properly hook the fish after it takes the bait, leaves no thought for the sand spike, which, for the time being at least, is completely abandoned. Then, after following the catch and finally landing it, the fisherman is obliged to retrace his steps to the sand spike if he is to recover it for further use. This is not an easy task, as one may easily imagine, because the sand spike is small and most of its length is embedded in the sand, which makes it almost invisible from any distance. As a consequence, the separate sand spike is often lost or too far away from the landing point of the catch to make recovery practical.

With the foregoing in mind, it is the principal object of my invention to overcome the objections inherent in a separate spike, and to provide a novel construction for fishing rod and sand spike whereby the latter is extensibly mounted in and carried by the spring butt section of a fishing rod in a manner enabling the rod to receive adequate support in any desired position and to permit telescoping of the spike into the butt section of the rod when the same is being carried.

I accomplish this object by means of the embodiment of my invention hereinafter described, set forth in the claims and illustratively exemplified in the accompanying drawing, in which:

Figure 1 is a substantially longitudinal sectional view of the spring butt section of a fishing rod showing the sand spike in projected position;

Figure 2 is a side elevational view of the same parts shown in Figure 1, except that the sand spike is telescoped within the butt section;

Figure 3 is a substantially enlarged longitudinal sectional view of the end of the butt section showing the sand spike slightly projected when the cap is open;

Figure 4 is a bottom plan view of the butt section showing the manner in which the spike is held in projected position.

Referring now to the drawing, 10 denotes the spring butt section of a fishing rod, which comprises a length of suitable material preferably a tough wood rod having a grip portion 11 adjacent one end. The outer end, not shown, of the butt 10 is provided with a socket fitting and reel support and the butt end beyond the grip 11 tapers off slightly to form a shank 12.

According to the present invention, the spring butt section 10 is bored from the end of the shank 12 well into the portion of the material of the grip 11.

The bore 13 thus formed accommodates the sand spike 14, which comprises a length of brass or non-corrosive metal rod having a longitudinal dimension somewhat shorter than the length of the bore 13, and which is preferably square and substantially smaller in transverse section than the diameter of the bore so as not to interfere with the flexibility of the section 10 when disposed therein. The inner end of the sand spike rod 14 is provided with a short cylindrical portion 15 which fits snugly in the bore 13. Between the portion 15 and the inner end of the bore 13 is a compression helical spring 16, which operates against the sand spike 14 to project it slightly from the shank 12 in order to afford means by which the spike may be gripped and withdrawn. Between the cylindrical portion 15 and square section is a reduced neck 17.

The shank 12 of the butt section 10 receives a metal ferrule 18 which is longer than the shank and projects beyond the latter to provide a space for a washer or gasket 19 encircling the sand spike and preventing moisture and sand from entering the bore 13.

The ferrule 18 is closed at its free end by a disc 20 having a square center bore 21 to allow the square portion of the spike 14 to pass through. In its outermost position, the spike 14 is prevented from telescoping into the bore 13 by means of the shoulders 22 at the end of the square portion, which, when the neck 17 is drawn into the bore 21, allows the spike to turn until the shoulders 22 seat against the wall about the bore 21 and thus prevent the spike from receding into the rod. The end of the cylindrical portion 15 is unable to pass through the square bore 21 and thus prevent the spike from being withdrawn entirely from the bore and rod.

Under tension of the spring 16 the spike 14 is projected outwardly of the disc 20 a short distance to enable the fisherman to grip the spike and draw it outwardly. When the spike is not in use, it must be held entirely within the rod or spring butt section, as shown in Figure 2. To hold the spike inside the rod and against the tension of its spring 16, a second disc or cap 23 is pivotally mounted at one side of the center on a pivot screw 24 carried by the first disc 20. The disc 23 is removably held in co-axial position over the disc 20 by means of a spring pressed ball 25 which projects through an opening in the face of the disc 23 and locates itself in a recess 26 in the adjacent face of the disc 20 diametrically opposite to the pivot screw 24. In order to facilitate closing the disc 23 over the projecting end of the spike, the disc is provided with a bevel 27 which is disposed along the edge in a position to move over opening or bore 21 and against the pointed free end of the sand spike 14. The disc 23 carries a rubber knob 29 on its outer face.

In operation, the rod and sand spike are set up as follows: The several sections of the fishing rod of which the spring butt section 10 is a part, are assembled and the fishing gear made ready. The cast is made and the rod is ready to be set up in the sand. The disc 23 is swung about on its pivot 24 until the spike 14 is free and the spring 16 ejects it far enough to allow the same to be grasped and drawn outwardly to its full length, which brings the neck portion 17 in the square bore 21 and permits turning of the spike to bring the shoulders 22 against the face of the disc 20, thus holding the spike from receding into the butt section 10. The spike 14 is then driven into the sand to support the entire rod in proper upright position. When a strike is made, the rod and spike are lifted until the latter is free and can be telescoped into the bore 13 by turning it slightly to bring the square portion in register with the square bore 21. The spike 14 engages the spring 16 and is pressed inwardly until the beveled portion 27 of the disc 23 can be moved over the pointed end to force it below the surface of disc 20 and entirely within the butt.

According to this invention, the sand spike is never detached from the rod and can be carried along from place to place and is always at hand after the catch is landed no matter how far the fisherman is obliged to travel from the point where the fish first strikes.

What I claim is:

1. The combination with a fishing rod having an axially bored butt section, of a sand spike arranged in said bore and capable of being drawn partly out of the latter to support the rod when driven into the sand, resilient means in said bore to engage and urge the spike to project the outer end thereof a short distance out of the butt, and an end plate provided with an orifice and carried at the end of the butt section to allow the spike to pass through in one position and to hold the spike from being entirely withdrawn from the bore and to hold the spike from receding into the bore.

2. The combination with a fishing rod having an axially bored butt section, of a sand spike arranged to slide in said bore and capable of being drawn partly out of the latter to support the rod when driven into the sand, resilient means in the head of said bore to yieldably urge the spike to project slightly from the end of the bore, and a closure pivotally mounted to move over the end of the butt section and bore to hold the spike completely within the bore and against the tension of said resilient means.

3. The combination with a fishing rod having a spring butt section provided with an axial bore projecting to a substantial depth into the section and opening out of the latter at its butt end, a sand spike movable axially of said bore comprising a square rod substantially smaller at its greatest transverse section than the diameter of the bore, and a cylindrical end portion closely fitting the bore of the section at its inner end, a spring disposed in the bore between the inner end thereof and the cylindrical portion to tend to yieldably project the said spike outwardly, and a closure for the butt end of the butt section mounted to move over the bore and to force the spike and hold it completely within the bore and against the spring.

4. The combination with a fishing rod having a spring butt section provided with an axial bore projecting to a substantial depth into the section and opening out of the latter at its butt end, a sand spike movable axially of said bore comprising a square rod substantially smaller at its greatest transverse section than the diameter of the bore, and a cylindrical end portion closely fitting the bore and a reduced neck portion between the square and cylindrical portions, a spring disposed in the bore between the inner end thereof and the cylindrical portion to yieldably urge the free end of the sand spike slightly beyond the open end of the bore, a ferrule embracing the butt end of the butt section and projecting to a point beyond the end thereof, a gasket embracing the sand spike and arranged against the butt end, a closure for the end of the ferrule having a square opening to allow the sand spike to pass through and to permit the spike to turn when the neck portion thereof is drawn into the square opening and cause the adjacent ends of the cylindrical and square portions to hold the spike in full projected position, and a cap pivotally mounted on the closure to move over the latter and hold the spike completely within the bore.

5. A combination of elements, as claimed in claim 4, including means for yieldably holding the cap in closed position over the said closure.

6. A combination of elements, as claimed in claim 4, in which said cap is provided with a beveled edge disposed to move in an arc over the square opening in the closure to engage the free end of the spike and cause it to recede into the bore.

ERNEST CEDER.